US012713002B2

(12) United States Patent
Zhao et al.

(10) Patent No.: US 12,713,002 B2
(45) Date of Patent: Aug. 18, 2026

(54) BOUNDARY FILTERING ON IntraBC AND IntraTMP CODED BLOCKS

(71) Applicant: Tencent America LLC, Palo Alto, CA (US)

(72) Inventors: Xin Zhao, San Jose, CA (US); Guichun Li, San Jose, CA (US); Lien-Fei Chen, Hsinchu (TW); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/380,011

(22) Filed: Oct. 13, 2023

(65) Prior Publication Data

US 2024/0129454 A1 Apr. 18, 2024

Related U.S. Application Data

(60) Provisional application No. 63/416,905, filed on Oct. 17, 2022.

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/159* (2014.11); *H04N 19/186* (2014.11); *H04N 19/82* (2014.11)

(58) Field of Classification Search
CPC .. H04N 19/105; H04N 19/117; H04N 19/159; H04N 19/186; H04N 19/82
See application file for complete search history.

(56) References Cited

U.S. PATENT DOCUMENTS

2015/0016516 A1* 1/2015 Saxena ................ H04N 19/593 375/240.12
2019/0110045 A1* 4/2019 Zhao .................... H04N 19/105
(Continued)

FOREIGN PATENT DOCUMENTS

CA 3122769 A1 * 6/2020 ............ H04N 19/70
KR 10-2021-0091322 A1 7/2021
(Continued)

OTHER PUBLICATIONS

C. Muhammed, et al., Algorithm description of Enhanced Compression Model 6 (ECM 6), Joint Video Experts Team (JVET) of ITU-T SG 16 WP 3 and ISO/IEC JTC 1/SC 29 27th Meeting, by teleconference, Jul. 13-22, 2022, Document: JVET-AA2025, pp. 1-53.

ITU-T Study Group. "Versatile video coding, Series H: Audiovisual and multimedia systems: Infrastructure of audiovisual services—coding of moving video." in General Secretariat and Telecom Radiocommunication (ITU-R) Standardization (ITU-T), sec. H 266, Aug. 2020, pp. 1-516.

(Continued)

*Primary Examiner* — Dave Czekaj
*Assistant Examiner* — Shanika M Brumfield
(74) *Attorney, Agent, or Firm* — ARENTFOX SCHIFF LLP

(57) ABSTRACT

Aspects of the disclosure include methods and apparatuses for video coding. One of the apparatuses includes processing circuitry that receives a coded video bitstream that includes a current picture with a block. The processing circuitry determines a prediction block of the block using one of an intra block copy (IBC) mode and an intra template matching (IntraTMP) mode. If boundary filtering is to be applied to the block, the processing circuitry applies the boundary filtering to a prediction sample located at a position (x',y') in the prediction block by determining a parameter W of the boundary filtering based on coded information of the block; determining weights used in the boundary filtering by right shifting the parameter W according to the position (x',y'); and generating a filtered prediction sample based on a linear (Continued)

combination of reference samples and the prediction sample according to the determined weights.

20 Claims, 9 Drawing Sheets

(51) Int. Cl.

| | |
|---|---|
| ***H04N 19/159*** | (2014.01) |
| ***H04N 19/186*** | (2014.01) |
| ***H04N 19/82*** | (2014.01) |

(56) References Cited

U.S. PATENT DOCUMENTS

| | | | | |
|---|---|---|---|---|
| 2020/0007870 | A1 | 1/2020 | Ramasubramonian et al. | |
| 2020/0154114 | A1* | 5/2020 | Zhao | H04N 19/117 |
| 2020/0195921 | A1* | 6/2020 | Van der Auwera | H04N 19/80 |
| 2021/0176465 | A1* | 6/2021 | Ray | H04N 19/186 |
| 2022/0159242 | A1* | 5/2022 | Liu | H04N 19/176 |
| 2022/0224915 | A1* | 7/2022 | Wang | H04N 19/176 |
| 2024/0244192 | A1* | 7/2024 | Jhu | H04N 19/176 |

FOREIGN PATENT DOCUMENTS

| | | | |
|---|---|---|---|
| WO | 2020/130889 | A1 | 6/2020 |
| WO | 2020/232355 | A1 | 11/2020 |

OTHER PUBLICATIONS

International Search Report and Written Opinion received for PCT Patent Application No. PCT/US2023/076974, mailed on Mar. 5, 2024, 9 pages.

Ma et al., "Non-EE2: Combining intra block copy and intra mode", Kwai Inc., Joint Video Experts Team (JVET) of ITU-T SG WP 3 and ISO/IEC JTC 1/SC 29 28th Meeting, Mainz, De, Oct. 21-28, 2022, Document: JVET-AB0191-v1, Oct. 22, 2022, 5 pages.

Office Action received for Japanese Patent Application No. 2025-521950, mailed on Jan. 20, 2026, 14 pages (8 pages of English Translation and 6 pages of Original Document).

Zhang et al., "PDPC skip for angular intra modes", vivo Mobile Communication Co., Ltd., Joint Video Experts Team (JVET) of ITU-T SG 16 WP 3 and ISO/IEC JTC 1/SC 29 24th Meeting, by teleconference, Oct. 6-15, 2021, Document: JVET-X0072-v2, Oct. 2021, pp. 1-7.

Lim et al., "AHG12: Using block vector derived from IntraTMP for IBC", Electronics and Telecommunications Research Institute (ETRI), Joint Video Experts Team (JVET) of ITU-T SG 16 WP 3 and ISO/IEC JTC 1/SC 29 27th Meeting, by teleconference, Jul. 13-22, 2022, Document: JVET-AA0053-v2, Jul. 2022, pp. 1-4.

Office Action received for Korean Patent Application No. 10-2024-7010943, mailed on Apr. 15, 2026, 16 pages (8 pages of English Translation and 8 pages of Original Document).

* cited by examiner

BOUNDARY FILTERING ON IntraBC AND IntraTMP CODED BLOCKS

INCORPORATION BY REFERENCE

The present application claims the benefit of priority to U.S. Provisional Application No. 63/416,905, "PDPC on IntraBC and IntraTMP coded blocks" filed on Oct. 17, 2022, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives a coded video bitstream that includes a current picture with a block coded with one of an intra block copy (IBC) mode and an intra template matching (IntraTMP) mode. The processing circuitry determines a prediction block of the block using the one of the IBC mode and the IntraTMP mode. In response to boundary filtering being applied to the block, the processing circuitry applies the boundary filtering to a prediction sample pred (x',y') located at a position (x',y') in the prediction block corresponding to a sample in the block by determining a parameter W of the boundary filtering based on coded information of the block; determining weights used in the boundary filtering by right shifting the parameter W according to the position (x',y'); and generating a filtered prediction sample based on a linear combination of reference samples and the prediction sample according to the determined weights. In an example, the coded information of the block includes a coding block size, a coding block aspect ratio, whether the block is a luma component or a chroma component, neighboring reconstructed samples of the block, boundary prediction samples in the prediction block, a difference between neighboring reconstructed samples of the block and boundary prediction samples in the prediction block, or a color format of the block.

In an aspect, the weights include a weight $w_L$ associated with a left reference sample $R_{-1,y'}$, a weight $w_T$ associated with a top reference sample $R_{x',-1}$, and a weight $(64-_L-w_T)$ associated with the prediction sample pred(x',y') and the weight $w_L$ is equal to W>>((x'<<1)>>0) and the weight $w_T$ is equal to W>>((y'<<1)>>0).

In an aspect, the boundary filtering is performed by a position-dependent predictor combination (PDPC) filter, and the processing circuitry generates the filtered prediction sample as Clip (0, (1<<BitDepth)−1, $(w_L \times R_{-1,y'}+w_T+(64-w_L-w_T)\times$pred(x',y')+32)>>6). The BitDepth indicates a bit depth.

In an example, the parameter W is determined as 8, 4, 16, or 2.

In an example, the processing circuitry determines whether the boundary filtering is applied to the block from neighboring reconstructed samples.

In an example, the processing circuitry detects a content type of the neighboring reconstructed samples. In response to the content type of the neighboring reconstructed samples being a screen content, the boundary filtering is not applied to the block. In response to the content type of the neighboring reconstructed samples not being the screen content, the boundary filtering is applied to the block.

In an example, the processing circuitry checks a number of color values of the neighboring reconstructed samples. In response to the number of color values being less than a threshold of color values, the processing circuitry detects the content type as the screen content.

In an example, the neighboring reconstructed samples are of a specific color component, and a color value includes a value of the specific color component.

In an example, the neighboring reconstructed samples are associated with multiple color components, and a color value includes a combination of respective values of the multiple color components.

In an example, the boundary filtering is applied only when a color component of the block is a luma component.

In an example, the boundary filtering is applied for each color component associated with the block.

In an example, the boundary filtering is applied only when a current slice including the block is an intra slice.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF ASPECTS

Figure 1:
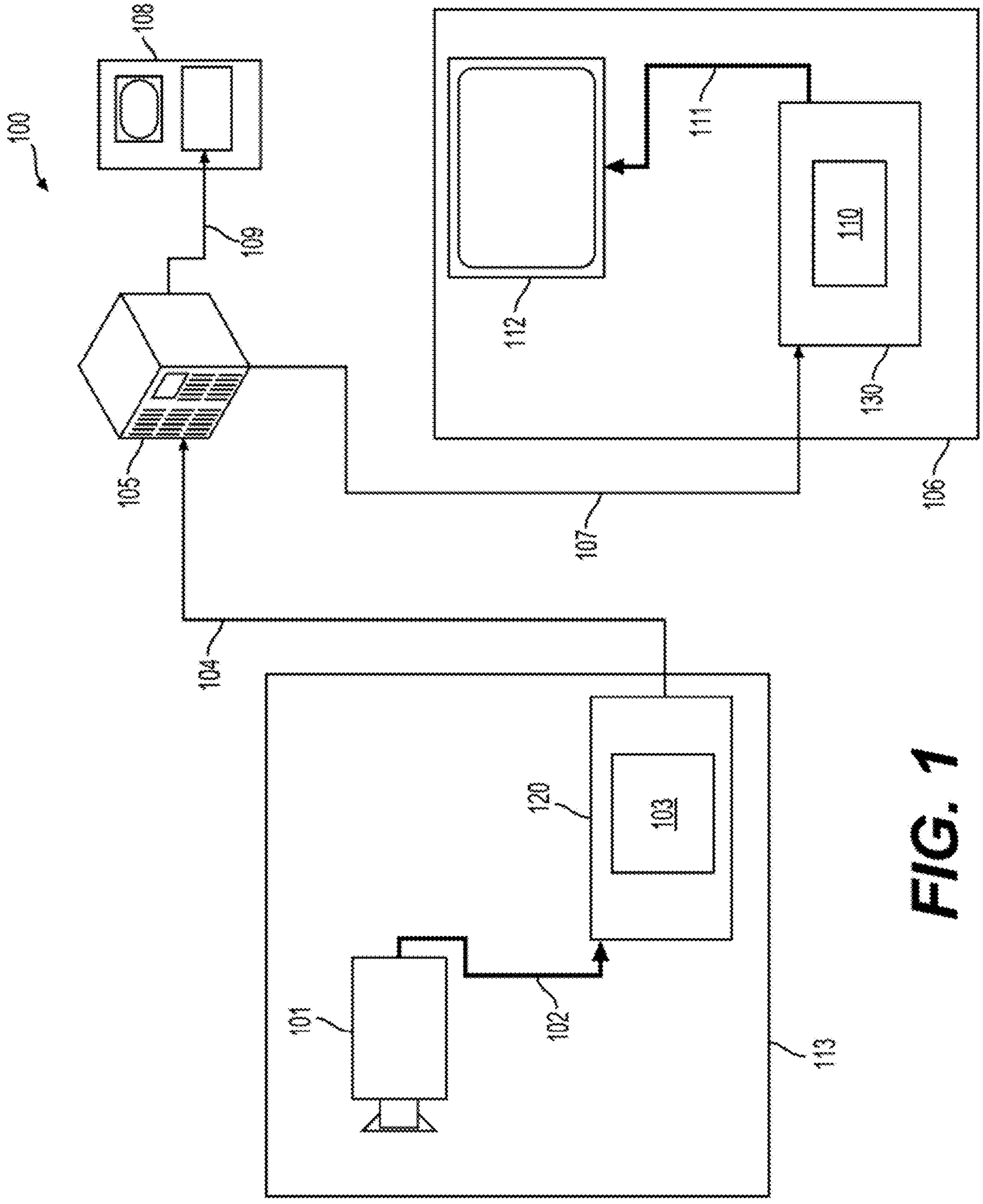
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
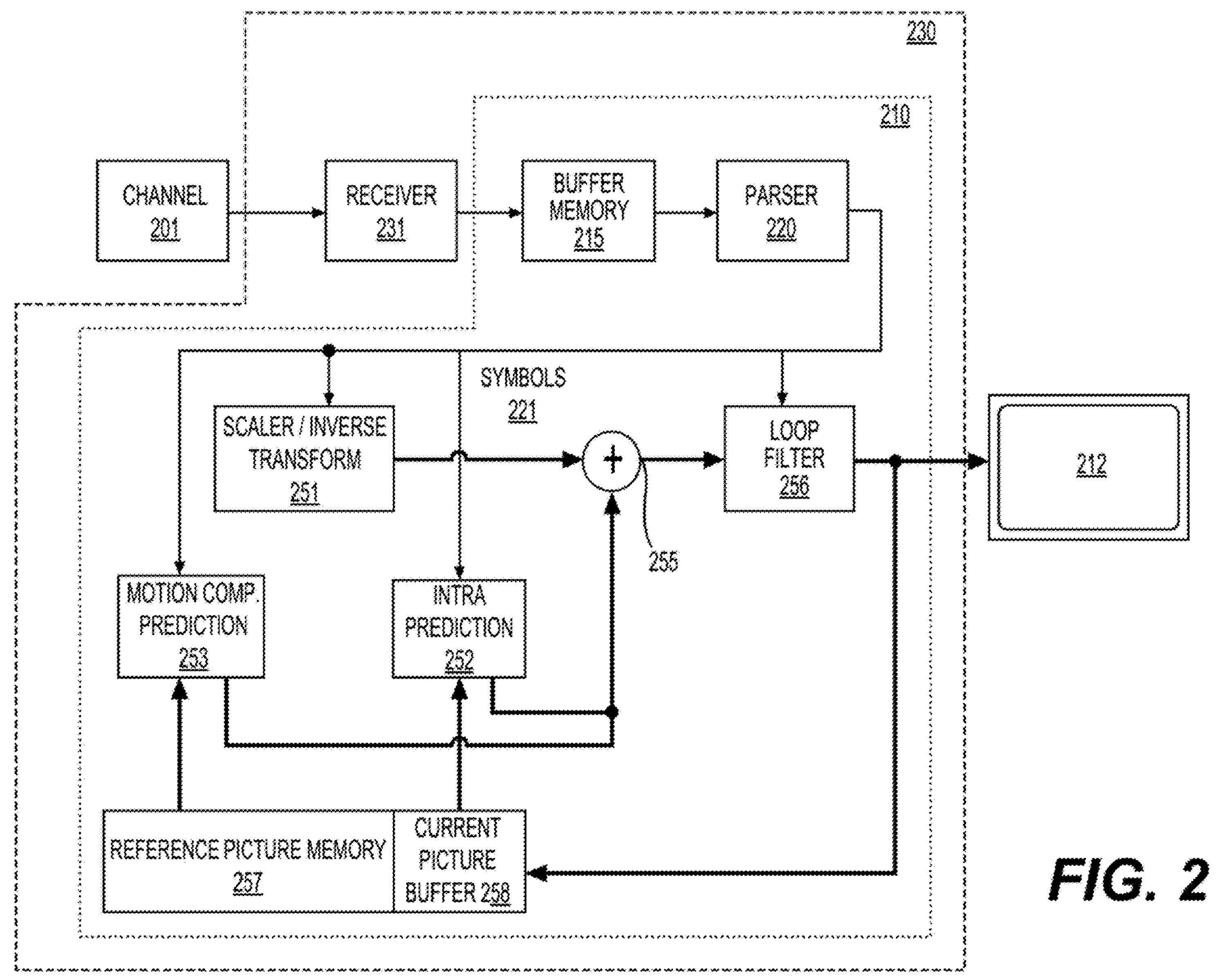
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
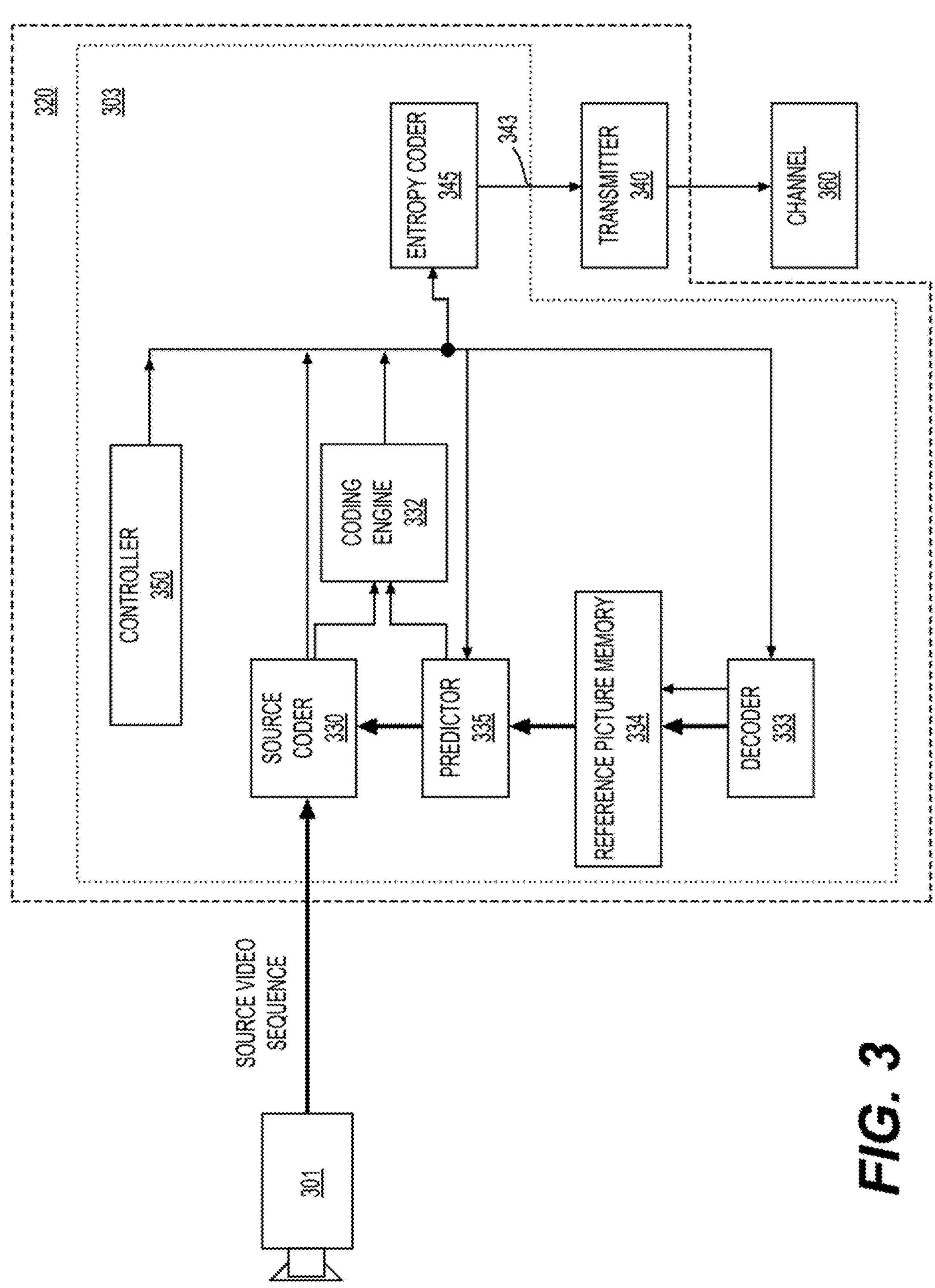
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303)

with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

An intra block copy (IBC) mode can be used in image and/or video coding, such as in Versatile Video Coding (VVC). The IBC concept was previously incorporated in the High Efficiency Video Coding (HEVC) standard. However, in some related technologies used in HEVC, it was necessary to reduce the implementation cost due to the size of the whole already reconstructed area of the current picture. A drawback of the IBC concept in some implementations, such as in HEVC, is the requirement of additional memory in a decoded picture buffer (DPB), for which hardware implementation may employ external memory. The additional external memory access comes with an increased memory bandwidth. Some implementations, such as VVC, use a fixed memory that can realize the IBC mode by using on-chip memory to significantly decrease the memory bandwidth requirement and hardware complexity. The reference sample memory (RSM) can be used to store samples of a single CTU. The special feature of the RSM includes the continuous update mechanism replacing the reconstructed samples of the left neighboring CTU with the reconstructed samples of the current CTU.

Moreover, the block vector (BV) coding of the IBC mode can employ the concept of a merge list used for inter prediction. The IBC list construction process can consider two spatial neighbor's BVs and five history-based BVs (HBVP). In an example, only the first HBVP is compared with spatial candidates when added to the candidate list. While the regular inter prediction uses two different candidate lists, one candidate list for the merge mode and the other candidate list for the regular mode, the candidate list in the IBC mode is used for both cases (e.g., including the IBC merge mode and the IBC regular mode). The merge mode (e.g., the IBC merge mode) may use up to six candidates of the list, whereas the regular mode (e.g., the IBC regular mode) uses only the first two candidates. The block vector difference (BVD) coding can employ the motion vector difference (MVD) process, resulting in a final BV of any magnitude. The reconstructed BV may point to an area outside of the reference sample area, and in some examples, require a correction by removing an absolute offset for each direction using a modulo operation with the RSM's width and height.

Figure 4:
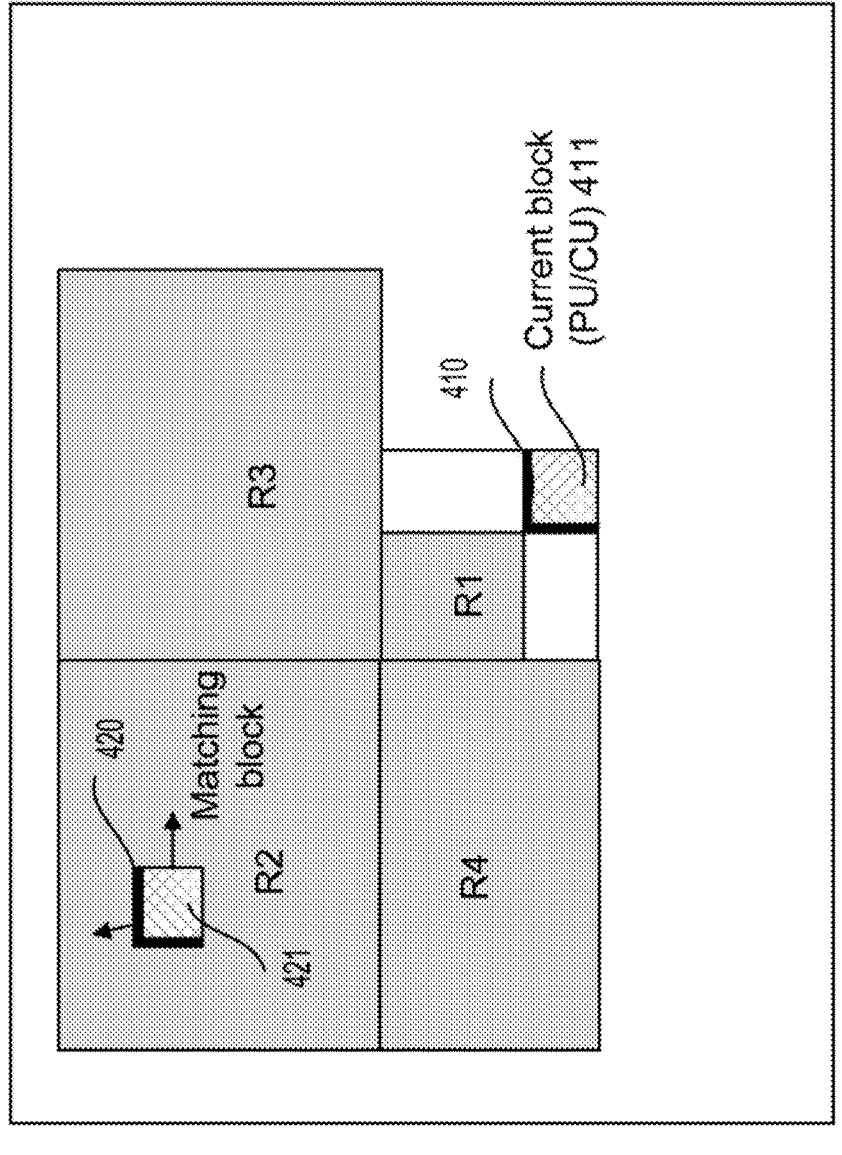
FIG. 4 shows an example of an intra template matching prediction (IntraTMP) mode according to an aspect of the disclosure.

FIG. 4 shows an example of an intra template matching prediction (IntraTMP) mode according to an aspect of the disclosure. In an aspect, such as in Enhanced Compression Model (ECM) software, the IntraTMP is a special intra prediction mode that can copy the best prediction block (e.g., a matching block (421)) from a reconstructed part of a current frame (or a current picture), where a template (e.g., an L-shaped template) (420) of the best prediction block can match a current template (410) of a current block (411). For a predefined search range, an encoder can search for the most similar template to the current template in the reconstructed part of the current frame and can use the corresponding block as a prediction block. The encoder can signal the usage of the IntraTMP mode, and the same prediction operation can be performed at the decoder side.

The prediction signal can be generated by matching the current template (410), such as an L-shaped causal neighbor of the current block (411), with a template of another block in a predefined search area. An exemplary search area shown in FIG. 4 can include multiple CTUs (or superblocks). Referring to FIG. 4, the search area can include a current CTU R1 (e.g., a portion of the current CTU R1), a top-left CTU R2, an above CTU R3, and a left CTU R4. The cost function can include any suitable cost function, such as a sum of absolute differences (SAD).

Within each region, the decoder can search for a template that has the least cost (e.g., the least SAD) with respect to the current template and can use a block associated with the template having the least cost as a prediction block.

Dimensions of regions indicated by (SearchRange_w, SearchRange_h) can be set to be proportional to a block dimension (BlkW, BlkH) to have a fixed number of SAD comparisons per pixel. Thus, $$\text{SearchRange\_}w = a \times \text{Blk}W \quad \text{Eq. (3)}$$

$$\text{SearchRange\_}h = a \times \text{Blk}H \quad \text{Eq. (4)}$$

The parameter 'a' can be a constant that controls the trade-off between the gain and the complexity. In an example, 'a' is 5.

The Intra template matching tool can be enabled for CUs with certain sizes, such as sizes less than or equal to 64 in width and height. The maximum CU size for the IntraTMP mode can be configurable. The IntraTMP mode can be signaled, for example, at a CU level through a dedicated flag when decoder-side intra mode derivation (DIMD) is not used for a current CU.

Boundary filtering can include applying an adjustment (or a filtering process) to prediction samples (or predicted samples) in a prediction block of a current block, such as prediction samples at block boundaries using nearby reconstructed samples from a previously coded area. In an example, the boundary filtering includes applying an adjustment (or a filtering process) to the prediction samples at the block boundaries using the nearby reconstructed samples from the previously coded area where the prediction samples at the block boundaries are located in the prediction block. A boundary filtering using Position-Dependent Predictor Combinations (PDPC) mode can be applied in image and/or video coding. In VVC, the results of intra prediction of the DC mode, the planar mode, and several angular modes can be further modified by the PDPC method. The PDPC mode is an intra prediction method which invokes a combination of the boundary reference samples and an HEVC style intra prediction with filtered boundary reference samples. The PDPC mode can be applied to the following intra modes without signaling: the planar mode, the DC mode, angular modes with intra angles less than or equal to the horizontal (e.g., the angle corresponding to the horizontal mode), and angular modes with intra angles greater than or equal to the vertical (e.g., the angle corresponding to the vertical mode) and less than or equal to 80°. If the current block is coded with a block-based delta pulse code modulation (BDPCM) mode or a multiple reference line (MRL) index is larger than 0, the PDPC mode is not applied.

The prediction sample pred(x',y') is predicted using an intra prediction mode (DC, planar, angular) and a linear combination of reference samples according to Eq. (1) as follows:

$$\text{pred}(x',y') = \text{Clip}(0,(1<<\text{BitDepth})-1,(wL \times R_{-1,y} + wT \times R_{x,-1} + (64-wL-wT) \times \text{pred}(x',y') + 32)>>6) \quad \text{Eq. (1)}$$

$R_{x,-1}$, $R_{-1,y}$ can represent the reference samples located at the top and left boundaries of the current sample (x',y'), respectively.

$$w_L = 32>>((x<<1)>>s), \quad \text{Eq. (2)}$$

$$w_T = 32>>((y<<1)>>s), \quad \text{Eq. (3)}$$

where s is a parameter controlling the decaying speed of the top reference sample weighting (also referred to a weight) $w_T$ from top to down and the left reference sample weighting (also referred to a weight) $w_L$ from left to right, respectively.

Figures 5A, 5B, 5C, 5D:
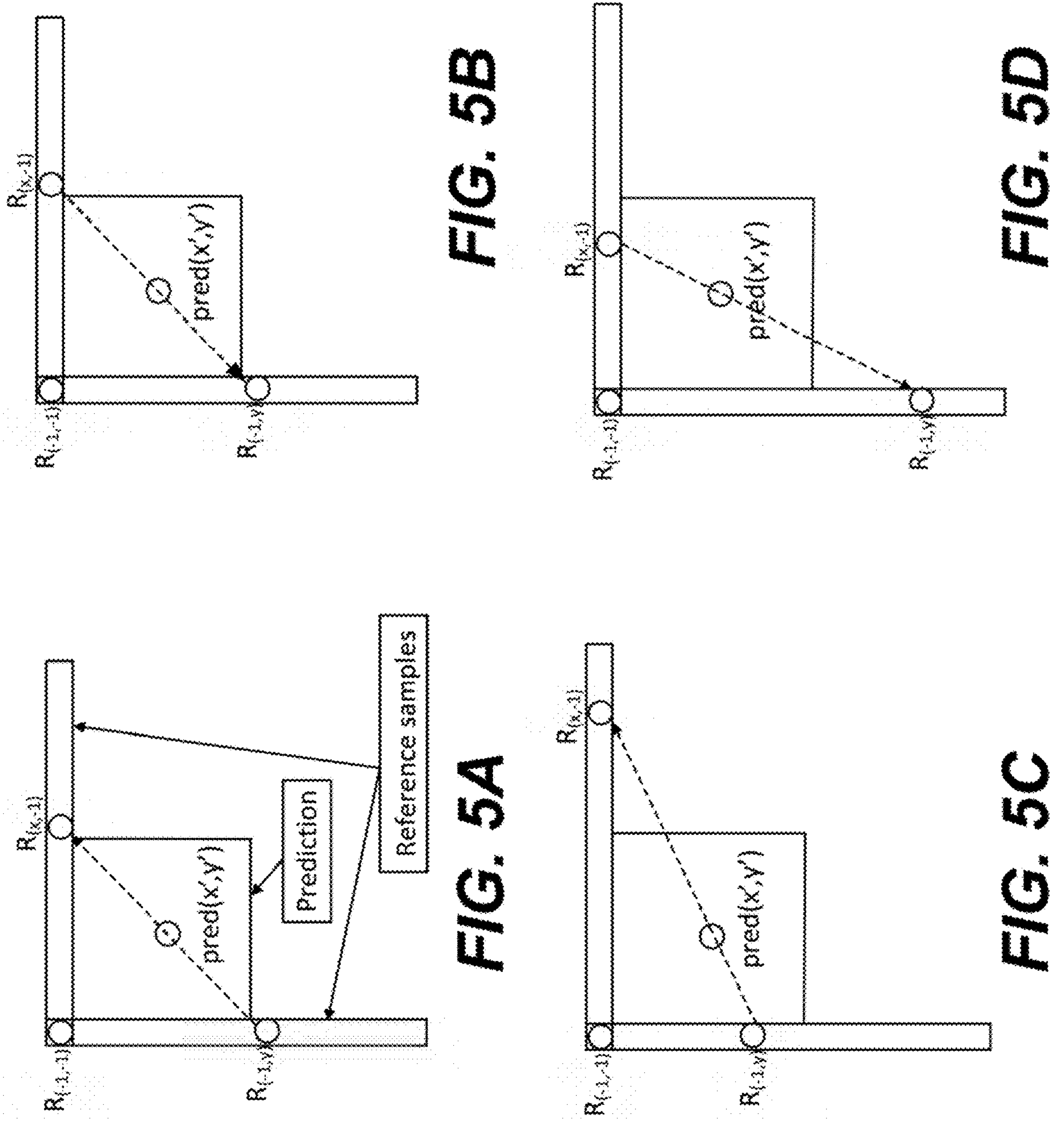
FIGS. 5A-5D show examples of reference samples for a Position-Dependent Predictor Combinations (PDPC) mode that is applied to various prediction modes.

FIGS. 5A-5D show examples of reference samples ($R_{x,-1}$ and $R_{-1,y}$) for the PDPC mode that is used (e.g., applied) in various prediction modes. FIG. 5A shows the reference samples ($R_{x,-1}$ and $R_{-1,y}$) used for the PDPC mode in a diagonal top-right mode. FIG. 5B shows the reference samples ($R_{x,-1}$ and $R_{-1,y}$) used for the PDPC mode in a diagonal bottom-left mode. FIG. 5C shows the reference samples ($R_{x,-1}$ and $R_{-1,y}$) used for the PDPC mode in an adjacent diagonal top-right mode. FIG. 5D shows the reference samples ($R_{x,-1}$ and $R_{-1,y}$) used for the PDPC mode in an adjacent diagonal bottom-left mode. The prediction sample pred(x',y') can be located at (x',y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other angular modes, the reference samples $R_{x,-1}$ and $R_{-1,y}$ can be located in fractional sample positions. In this case, the sample value of the nearest integer sample location is used.

In some example, (e.g., the PDPC mode is applied to the DC, the planar, the horizontal intra mode, and the vertical intra mode), Eq. (1) can become $$\text{pred}(x',y')=\text{Clip}(0,(1<<\text{BitDepth})-1,(wL\times R_{-1,y'}+wT\times R_{x',-1}+(64-wL-wT)\times\text{pred}(x',y')+32)>>6) \quad \text{Eq. (4)}$$

If the PDPC is applied to the DC, the planar, the horizontal, and the vertical intra modes, additional boundary filters are not needed, as required in the case of the HEVC DC mode boundary filter or horizontal/vertical mode edge filters. The PDPC process for the DC and Planar modes can be identical. For angular modes, if the current angular mode is HOR_IDX or VER_IDX, left or top reference samples are not used, respectively. The PDPC weights and scaling factors can be dependent on prediction modes and the block sizes. The PDPC mode can be applied to the block with both the width and the height greater than or equal to a threshold, such as 4.

In some examples, the PDPC mode can be applied to certain prediction blocks, such as an IntraBC and/or an IntraTMP prediction block. In the original PDPC design, for example, the PDPC mode designed for an intra prediction mode such as the DC mode, the Planar mode, or an angular mode, may not be optimized for certain prediction modes such as the IntraBC mode and/or the IntraTMP prediction mode, and in some examples there is coding loss if the original PDPC design is directly applied on top of the IntraBC and/or IntraTMP prediction modes. Each of the IBC mode and the IntraTMP prediction mode can use a reference block to predict a current block where the reference block and the current block are in the same picture, and the reference block is indicated by a block vector that points from the current block to the reference block. The PDPC mode can be applied to one or more other prediction modes that use a reference block in a same picture, in some aspects. In some examples, the IBC mode or the IntraTMP prediction mode may be considered as intra prediction (e.g., an intra prediction mode) in the sense that the reference block in the same picture as the current block is used to predict the current block. In some examples, the IBC mode or the IntraTMP prediction mode may be considered as a separate mode that is different from intra prediction and inter prediction. This disclosure includes methods that apply boundary filtering (such as the PDPC mode) to a prediction block coded by certain prediction modes based on block/template matching, such as the IntraBC mode or the IntraTMP mode. In an example, the boundary filtering applies adjustment to the prediction samples at block boundaries using the nearby reconstructed sample from neighboring coded block(s).

IBC mode can also be referred to as IntraBC mode. The IBC mode can include different modes, such as the IBC merge mode and the IBC regular mode. Boundary filtering can be applied to a prediction block coded using the IBC mode or the IntraTMP mode. The boundary filtering can apply an adjustment to prediction samples in the prediction block, such as prediction samples at block boundaries using the nearby reconstructed samples from a previously coded area. In one aspect, the boundary filtering is the same as the PDPC mode (also referred to as the PDPC filter) applied on other intra prediction modes, e.g., the DC mode and the Planar mode, such as described by Eqs. (2)-(4).

In one aspect, the boundary filtering is based on the PDPC mode of other intra prediction modes, e.g, the DC mode and the Planar mode, with some adjustments.

In one example, a different value of the parameter s is used when comparing to the PDPC mode used for other intra prediction modes.

Figure 6:
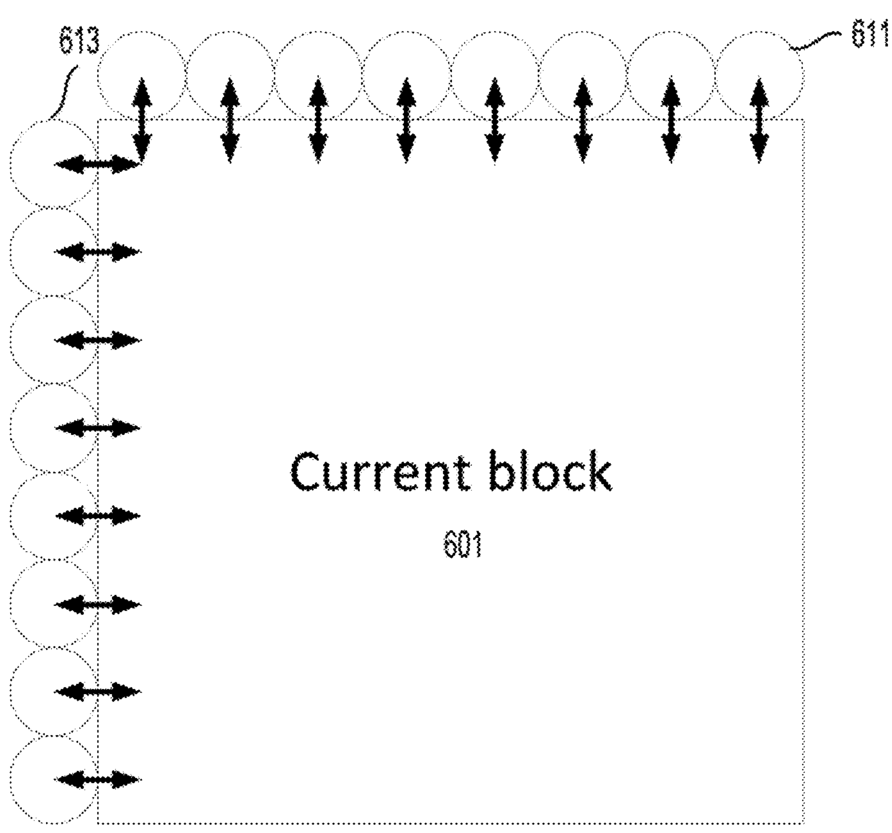
FIG. 6 shows an example of boundary filtering using two tap filters according to an aspect of the disclosure.

FIG. 6 shows an example of the boundary filtering using two tap filters according to an aspect of the disclosure. In one aspect, for the left (top) boundary prediction samples, the boundary filtering is a weighted average of left (top) neighboring reconstructed samples and left (top) boundary prediction samples. An example of the boundary filtering is shown in FIG. 6 using two tap filters for a top row of boundary prediction samples and a left column of boundary prediction samples. The left neighboring reconstructed samples (613) and the top neighboring reconstructed samples (611) can be neighbors of a current block (601). The number of top rows and left columns of prediction samples in the current block (601) that are filtered using the boundary filter can depend on the block size.

In one aspect, a block-level and/or a high level syntax (HLS)-level flag is signaled to indicate whether the PDPC mode is applied to the IntraBC and/or IntraTMP prediction block. The HLS may be a flag in a video parameter set (VPS), a picture parameter set (PPS), a sequence parameter set (SPS), an adaptive parameter set (APS), a Slice header, a frame header, a tile header, or a CTU header.

In one aspect, a template matching (TM) cost (e.g., similar to that used for the IntraTMP mode shown in FIG. 4) of the current IBC or IntraTMP block may be used to determine whether and how to apply the boundary filter.

In one example, for a block coded with the IBC model, the TM cost is calculated based on a template area pointed by a BV of the current block. When the TM cost is below or equal to a threshold value T1, the boundary filtering may be disabled. For example, T1 is equal to 0.

In another example, for a block coded in the IntraTMP mode, the TM cost of the IntraTMP mode may be used to check against a threshold T2. When the TM cost is below or equal to the threshold value T2, the boundary filtering may be disabled.

In one aspect, the value of T1 and the value of T2 can be different.

In one aspect, the PDPC parameter, such as the parameter s, depends on the template matching cost such as described above.

In one aspect, the boundary filter is not applied when the current coded block is coded in the IBC merge mode.

In another aspect, only the left neighboring reconstructed samples are used for the boundary filter when the current block is coded in the IBC merge mode and a BVP is derived from neighboring top or top-right spatial candidates. In another aspect, only the top neighboring reconstructed samples are used for the boundary filter when the current block is coded in the IBC merge mode and the BVP is derived from neighboring left or left-bottom spatial candidates.

In one aspect, the residuals of the block coded by the IntraTMP mode and the IntraBC mode are used to determine whether and how to apply the boundary filter.

In one example, when the energy of residual is greater than a threshold T1', the boundary filter is applied.

In one example, when the energy of residual is less than a threshold T2', the boundary filter is not applied.

In one example, the energy of residual is measured by SAD, SSE, SATD, MSE of the residual block.

In one example, the values of threshold T1' and T2' may be different for a block coded by the IntraTMP mode and the IntraBC mode.

In one example, the PDPC parameter, such as the parameter s, depends on the energy of the residual.

In one aspect, the boundary filtering on the IBC prediction block (also referred to as the IntraBC prediction block) and/or the IntraTMP prediction block is the PDPC filter, however, the parameter(s) used in the PDPC mode that is applied to the IBC prediction block or the IntraTMP prediction block can be different from the parameter(s) used in the PDPC mode applied to other intra prediction modes (such as the Planar mode, the DC mode). In an example, the PDPC mode applied to the IBC prediction block and/or the IntraTMP prediction block is described using Eq. (4).

Figure 7:
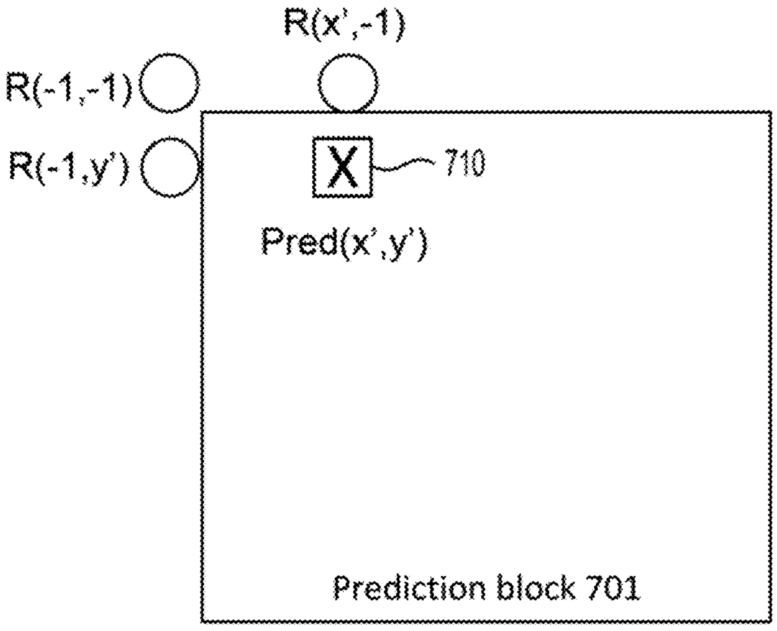
FIG. 7 shows an example of boundary filtering according to an aspect of the disclosure.

FIG. 7 shows an example of the boundary filtering (also referred to as a boundary filter) according to an aspect of the disclosure. A current block can be coded with one of the IBC mode (or the IntraBC mode) and the IntraTMP mode. For example, the current block is predicted with the one of the IBC mode and the IntraTMP mode, and a prediction block (701) of the current block can be determined (e.g., generated) using the one of the IBC mode and the IntraTMP mode. In an example, the prediction block (701) is an IBC predicted block (also referred to as an IBC prediction block) that is predicted using the IBC mode. In an example, the prediction block (701) is an IntraTMP predicted block (also referred to as an IntraTMP prediction block) that is predicted using the IntraTMP mode. The boundary filtering can be applied to the prediction block (701) that is obtained using the IBC mode or the IntraTMP mode. Thus, the boundary filtering can be applied to a prediction sample pred(x',y') (marked in X in FIG. 7) (710) located at a position (x',y') in the prediction block (701) corresponding to a sample in the current block.

In an aspect, parameter(s) of the boundary filtering can depend on coded information of the current block. The parameter(s) (e.g., including a parameter W) of the boundary filtering can be determined based on the coded information of the current block. The coded information can include (i) size information of the current block such as a current block size, a current block aspect ratio, (ii) color component information such as whether the current block is a luma component or a chroma component, (iii) neighboring reconstructed samples (also referred to as reference samples) of the current block or the prediction block (701), (iv) prediction samples (e.g., boundary prediction samples) in the prediction block (701), (v) a difference between neighboring reconstructed samples of the current block and boundary prediction samples in the prediction block (701), and/or (vi) a color format of the current block such as YUV 4:2:0, YUV 4:2:2, YUV 4:4:4, RGB, or the like. Referring to FIG. 7, the prediction block (701) includes prediction samples that are predicted using the IBC mode or the IntraTMP mode. In an example, the boundary filtering is applied to the prediction samples in the prediction block (701). In an example, the boundary filtering is applied to the boundary prediction samples in the prediction block (701). The boundary prediction samples can include one or more lines of prediction samples near the boundaries of the prediction block (701).

The weights used in the boundary filtering can be determined by right shifting the parameter W according to the position (x',y'). A filtered prediction sample can be generated based on a linear combination of reference sample(s) and the prediction sample pred(x',y') (710) according to the respective determined weights. The linear combination can be a weighted average of the reference sample(s) and the prediction sample pred(x',y') (710) according to the respective determined weights. The boundary filtering can be performed on the prediction sample pred(x',y') (710) by calculating the weighted average of the reference sample(s) and the prediction sample pred(x',y') (710) according to the respective weights. The reference samples can include neighboring reconstructed samples of the prediction block (701), such as a left reference sample $R_{-1,y'}$ (e.g., a left neighboring reconstructed sample) and a top reference sample $R_{x',-1}$ (e.g., a top neighboring reconstructed sample). The weights can also be referred to filter coefficients. If the boundary filtering is performed using the PDPC mode (e.g., the boundary filtering is the PDPC mode), the weights can be referred to as the PDPC weights or the PDPC filter coefficients.

In an example, the weighted average is ($w_L \times R_{-1,y'} + w_T \times R_{x',-1} + w_{pred} \times pred(x', y')$). The weights of the boundary filtering can include $w_L$ associated with the left reference sample $R_{-1,y'}$, $w_T$ associated with the top reference sample $R_{x',-1}$, and $w_{pred}$ associated with the prediction sample pred(x',y'). In an example, a sum of the weights is predefined or is a constant (e.g., 64), and thus one weight can be determined from two other weights, such as $w_{pred}=(64-wL-wT)$. In an example, the weighted average is clipped using a clipping function. In an example, the boundary filtering is performed by the PDPC filter (or the PDPC mode), for example, the filtered prediction sample (or the boundary filtered prediction sample) (701) can be generated using Eq. (4) where the reference samples $R_{-1,y'}$ and $R_{x',-1}$ and the prediction sample (710) are shown in FIG. 7. A parameter BitDepth in Eq. (4) can indicate a bit depth.

The boundary filtering performed by the PDPC (e.g., using Eq. (4)) on the IBC prediction block or the IntraTMP prediction block can be different from the PDPC (e.g., described using Eqs. (1)-(3) or Eqs. (2)-(4)) performed on an intra prediction block obtained using, for example, an intra prediction mode (e.g., the DC mode, the Planar Mode).

In an aspect, the parameter(s) used in the PDPC mode for the IBC prediction block or the IntraTMP prediction block can be different from the parameter(s) in the PDPC mode for intra prediction modes (e.g., the DC mode, the Planar Mode) or for an intra prediction block (e.g., an intra block predicted using an intra prediction mode, such as the DC mode, the Planar Mode, or the like).

In one example, the following formula (Eqs. (5)-(6)) is used to derive the PDPC filter coefficients (the weights) when the PDPC mode is applied to the IntraBC and/or IntraTMP prediction block (e.g., the prediction block (701)). x' and y' can represent the position of the processed sample (e.g., pred (x',y') (602)) within the prediction block (701). Exemplary values of W can include, but are not limited to 8, 4, 16, and 2. In an example, the parameter W is determined as 8, 4, 16, or 2. In an example, W is not 32. The following formula (Eqs. (5)-(6)) can be used to derive the weights (the PDPC filter coefficients) in the PDPC mode that is applied to the IntraBC prediction block and/or the IntraTMP prediction block.

$$w_L = W >> ((x' << 1) >> 0), \quad \text{Eq. (5)}$$

$$w_T = W >> ((y' << 1) >> 0), \quad \text{Eq. (6)}$$

More specifically, a decoder according to the present disclosure may determine a prediction block of the block using the one of the IBC mode and the IntraTMP mode. In response to boundary filtering being applied to the block, the decoder may apply the boundary filtering to a prediction sample pred(x',y') located at a position (x',y') in the prediction block corresponding to a sample in the block by determining a parameter W of the boundary filtering based on coded information of the block, and determining weights used in the boundary filtering by right shifting the parameter W according to the position (x',y'). Furthermore, the decoder may generate a filtered prediction sample based on a linear combination of reference samples and the prediction sample according to the determined weights.

On the other hand, as described above, the weights (e.g., $w_L$ and $w_T$) in the PDPC mode for intra prediction modes (such as the Planar mode, the DC mode) may be obtained using Eqs. (2)-(3) based on the parameter s and a constant value that is 32.

Comparing Eqs. (2)-(3) and Eqs. (5)-(6), the weights $w_L$ and $w_T$ obtained using Eqs. (5)-(6) in the PDPC mode for the IntraBC and/or IntraTMP prediction block can be obtained based on the parameter W and without using the parameter s (instead, a constant value "0" is used in Eqs. (5)-(6)). The weights $w_L$ and $w_T$ obtained using Eqs. (2)-(3) in the PDPC mode for the intra prediction blocks can be obtained without using the parameter W (e.g., a constant value "32" is used) and based on the parameter s. The parameter W in Eqs. (5)-(6) can vary and the value "32" in Eqs. (2)-(3) is fixed. W can also be different from 32. In Eqs. (2)-(3), the parameter s can vary, however, in Eqs. (5)-(6), s is replaced by a value "0". In an example, Eqs. (5)-(6) become $w_L$=W>>((x'<<1)) and $w_T$=W>>((y'<<1)), and the weights $w_L$ and $w_T$ obtained using Eqs. (5)-(6) for the IntraBC and/or IntraTMP prediction block can be obtained based on the parameter W and do not depend on the parameter s.

Referring to Eqs. (2)-(3), the parameter(s) in the PDPC mode for the intra prediction blocks may include the parameter s. Referring to Eqs. (5)-(6), the parameter(s) in the PDPC mode for the IntraBC and/or IntraTMP prediction block may include the parameter W. Comparing Eqs. (2)-(3) with Eqs. (5)-(6), the parameter(s) (e.g., including the parameter W) in the PDPC mode for the IntraBC and/or IntraTMP prediction block can be different from the parameter(s) (e.g., including the parameter s) in the PDPC mode for the intra prediction blocks.

In an aspect, the parameters of the PDPC filter (e.g., the PDPC filter for the IntraBC and/or IntraTMP prediction block) depend on the coded information, including, but not limited to a coding block size, a coding block aspect ratio, whether the current block is a luma or a chroma component, neighboring reconstruction samples, boundary prediction samples inside the prediction block (e.g., the boundary IBC prediction samples), a difference between neighboring reconstruction samples and boundary prediction samples, a color format (e.g. YUV 4:2:0, YUV 4:2:2, YUV 4:4:4, or RGB). In an example, there can be a relationship between the parameters (e.g., the parameter W) of the PDPC filter (e.g., for the IntraBC and/or IntraTMP prediction block) and the coded information. In an example, the parameter W increases with the coding block size. In an example, W decreases with the coding block size. Thus, the parameters of the PDPC filter (e.g., the PDPC filter for the IntraBC and/or IntraTMP prediction block) may be derived based on the coded information described above. The weights (e.g., $w_L$ and $w_T$) of the PDPC filter (e.g., for the IntraBC and/or IntraTMP prediction block) can depend on the coded information, for example, due to the dependence of the weights on the parameter W such as shown in Eqs. (5)-(6).

In one example, the parameters of the PDPC filter (e.g., the PDPC filter for the IntraBC and/or IntraTMP prediction block) may be derived for each color component or a subset of color components separately.

In one aspect, whether the boundary filtering (e.g., the PDPC mode) is applied to the current block or the prediction block (701) that is IBC or IntraTMP predicted can be determined from neighboring reconstructed samples. Whether the PDPC mode is applied can be determined adaptively based on neighboring reconstruction samples (also referred to as neighboring reconstructed samples), for example, whether the PDPC mode such as described by Eqs. (4)-(6) is applied to the prediction block (701) can be determined adaptively based on the neighboring reconstruction samples.

In one example, a content type detection process is applied on the neighboring reconstructed samples. If the neighboring reconstruction is determined as a screen content (e.g., non-camera-captured content), then the PDPC mode is not applied to the IntraBC and/or IntraTMP prediction blocks (e.g., the IBC prediction block and/or the IntraTMP prediction block). Otherwise, the PDPC mode is applied to the IntraBC and/or IntraTMP prediction blocks (e.g., the IBC prediction block and/or the IntraTMP prediction block). For example, a content type of the neighboring reconstructed samples is detected. If the content type of the neighboring reconstructed samples is the screen content, the boundary filtering (e.g., the PDPC mode) is not applied to the block (e.g., the IBC prediction block and/or the IntraTMP prediction block such as the prediction block 701)). If the content type of the neighboring reconstructed samples is not the screen content (e.g., the content type is natural, camera-captured content), the boundary filtering (e.g., the PDPC mode) is applied to the block (e.g., the IBC prediction block and/or the IntraTMP prediction block such as the prediction block 701)).

In one example, the content type detection process involves checking how many distinct color values are in neighboring blocks. If there is less than a given threshold of the color values, then the neighboring reconstruction samples can be determined to have screen content. For example, a number of color values (e.g., a number of distinct color values) of the neighboring reconstructed samples is checked. If the number of color values is less than a threshold of color values, the content type of the neighboring reconstructed samples is detected as the screen content.

In an example, the neighboring reconstructed samples are of a specific color component, and a color value includes a value of the specific color component. In one example, the color value means the value of one specific color component, e.g., luma or a luma component.

In an example, the neighboring reconstructed samples are associated with multiple color components, and a color value includes a combination of respective values of the multiple color components. In one example, the color value means the value combination of multiple color components, e.g., a combination of Y, Cb and Cr, or a combination of R, G, and B. In an example, Y represents a luma component, and Cb and Cr represent chroma components.

In an example, the boundary filtering (e.g., the PDPC mode) is applied only for a pre-defined color component, for example when a color component of the current block (or the prediction block (701)) (e.g., an IBC coded block or an IntraTMP coded block) is a luma component. The boundary filtering can be applied for each color component associated with the block. In one aspect, the PDPC mode is only applied on IntraBC and/or IntraTMP coded blocks when the current color component is luma (which is the luma component). Alternatively, the PDPC mode is only applied on IntraBC and/or IntraTMP coded blocks for all the color components (e.g., all of Y, Cb and Cr).

In an example, the boundary filtering (e.g., the PDPC mode) is applied to the prediction block (701) only when a current slice including the current block is a pre-defined slice type, such as an intra slice.

In one aspect, the PDPC mode is only applied to IntraBC and/or IntraTMP coded blocks (e.g., an IBC coded block or an IntraTMP coded block) when the current slice is an intra slice. The current slice includes the IntraBC and/or IntraTMP coded blocks. In an example, whether the PDPC mode is applied on an intra slice and/or an inter slice is coded in a high-level syntax (HLS). The HLS may be a flag in a VPS, a PPS, an SPS, an APS, a slice header, a frame header, a tile header, or a CTU header.

Figure 8:
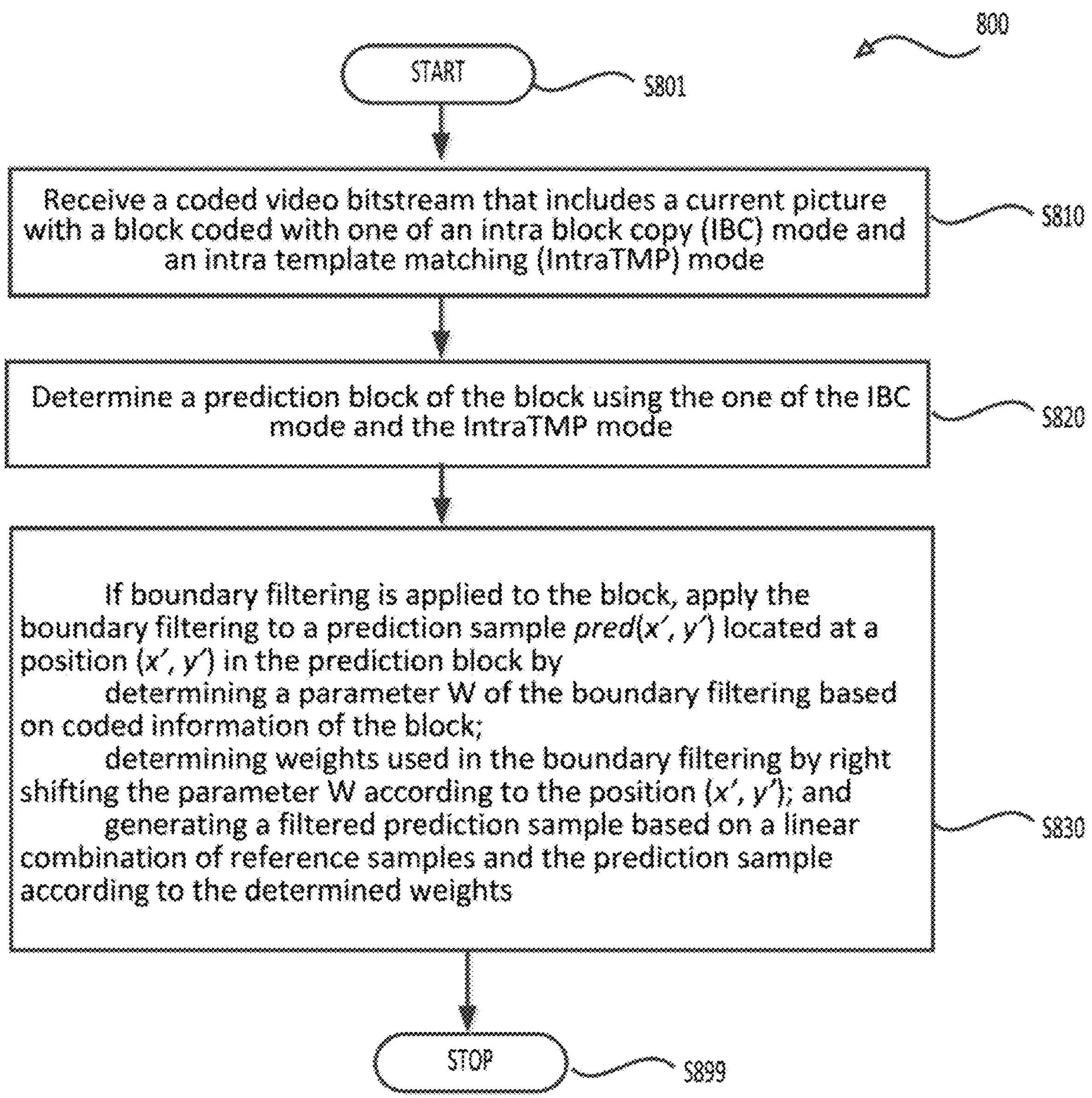
FIG. 8 shows a flow chart outlining a process according to some aspect of the disclosure.

FIG. 8 shows a flow chart outlining a process (800) according to an aspect of the disclosure. The process (800) can be used in a video decoder. In various aspects, the process (800) is executed by processing circuitry, such as the processing circuitry that performs functions of the video decoder (110), the processing circuitry that performs functions of the video decoder (210), and the like. In some aspects, the process (800) is implemented in software instructions, thus when the processing circuitry executes the software instructions, the processing circuitry performs the process (800). The process starts at (S801) and proceeds to (S810).

At (S810), a coded video bitstream that includes a current picture with a block (e.g., the current block described in FIG. 7) coded with one of an intra block copy (IBC) mode and an intra template matching (IntraTMP) mode can be received.

At (S820), a prediction block (e.g., the prediction block (701) described in FIG. 7) of the block can be determined using the one of the IBC mode and the IntraTMP mode.

At (S830), in response to boundary filtering being applied to the block, the boundary filtering can be applied to a prediction sample pred(x',y') located at a position (x',y') in the prediction block corresponding to a sample in the block, such as described with reference to FIG. 7. The prediction sample pred(x',y') can be filtered by the boundary filtering as follows: Weights used in the boundary filtering can be determined, for example, by right shifting a parameter W according to the position (x',y') in the prediction block. A filtered prediction sample can be generated based on a linear combination of reference samples and the prediction sample according to the determined weights.

In an example, the parameter W of the boundary filtering is determined (e.g., derived) based on coded information of the block. The coded information can include a coding block size, a coding block aspect ratio, whether the block is a luma component or a chroma component, neighboring reconstructed samples of the block, boundary prediction samples in the prediction block, a difference between neighboring reconstructed samples of the block and boundary prediction samples in the prediction block, or a color format of the block. In an example, the parameter W is determined as 8, 4, 16, or 2.

The reference samples can include a left reference sample $R_{-1,y'}$ and a top reference sample $R_{x',-1}$ such as shown in FIG. 7. The weights can include a weight $w_L$ associated with the left reference sample $R_{-1,y'}$, a weight $w_T$ associated with the top reference sample and a weight $(64-w_L-w_T)$ associated with the prediction sample pred(x',y'). The weight $w_L$ can be determined as $w_L$=W>>((x'<<1)>>0) and the weight $w_T$ can be determined as $w_T$=W>>((y'<<1)>>0).

In an example, the boundary filtering is performed by a position-dependent predictor combination (PDPC) filter. The filtered prediction sample can be generated as Clip (0, (1<<BitDepth)−1, $(w_L \times R_{-1,y'}+w_T \times R_{x',-1}+(64-w_L-w_T)\times$ pred(x',y')+32)>>6). The parameter BitDepth indicates a bit depth.

Then, the process proceeds to (S899) and terminates.

The process (800) can be suitably adapted. Step(s) in the process (800) can be modified and/or omitted. Additional step(s) can be added. Any suitable order of implementation can be used. In an example, whether the boundary filtering is applied to the block is determined from neighboring reconstructed samples of the block or the prediction block.

Figure 9:
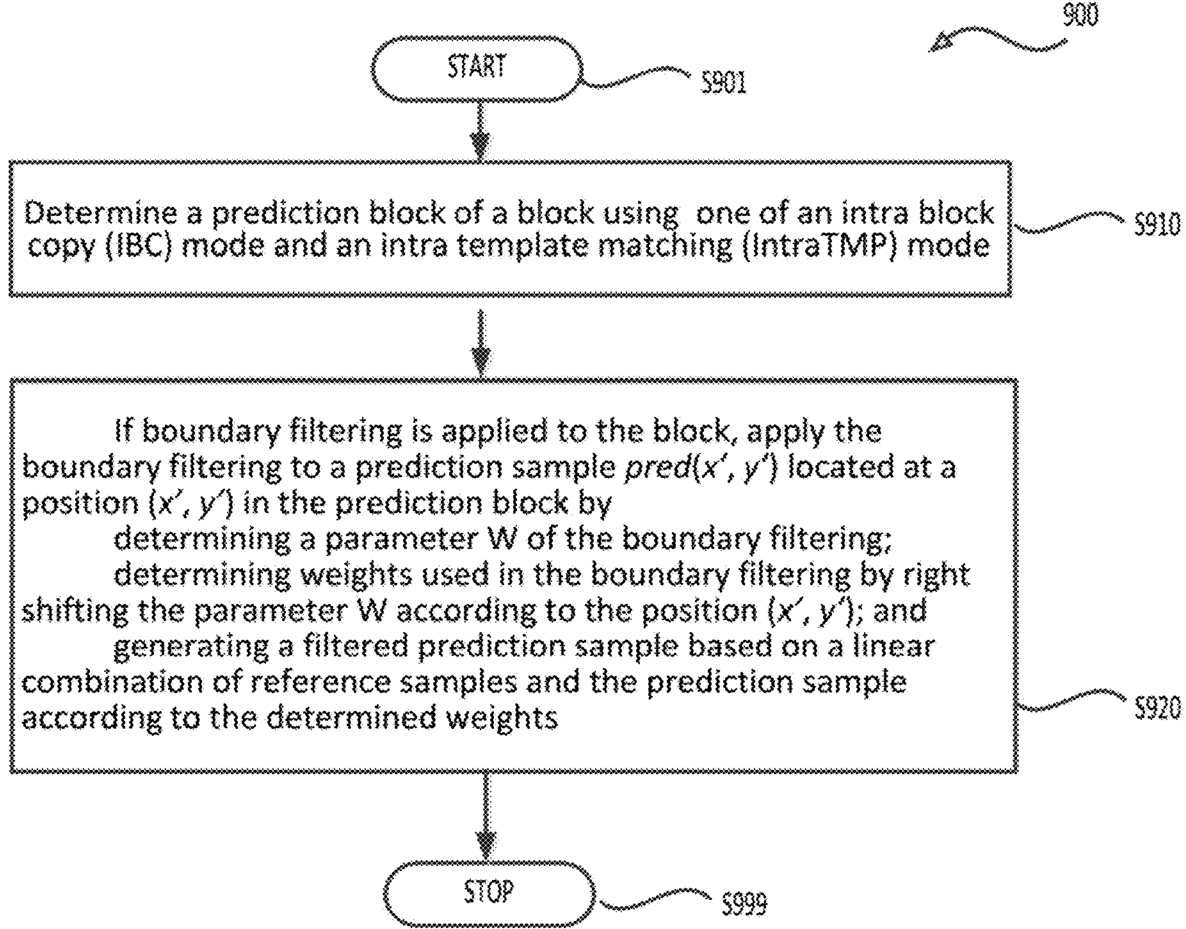
FIG. 9 shows a flow chart outlining another process according to some aspect of the disclosure.

FIG. 9 shows a flow chart outlining a process (900) according to an aspect of the disclosure. The process (900) can be used in a video encoder. In various aspects, the process (900) is executed by processing circuitry, such as the processing circuitry that performs functions of the video encoder (103), the processing circuitry that performs functions of the video encoder (303), and the like. In some aspects, the process (900) is implemented in software instructions, thus when the processing circuitry executes the software instructions, the processing circuitry performs the process (900). The process starts at (S901) and proceeds to (S910).

At (S910), a prediction block of a block can be determined using one of an intra block copy (IBC) mode and an intra template matching (IntraTMP) mode.

At (S920), in response to boundary filtering being applied to the block, the boundary filtering can be applied to a prediction sample pred(x',y') located at a position (x',y') in the prediction block corresponding to a sample in the block, such as described with reference to FIG. 7. The prediction sample pred(x',y') can be filtered by the boundary filtering as follows: Weights used in the boundary filtering can be determined, for example, by right shifting a parameter W according to the position (x',y') in the prediction block. A filtered prediction sample can be generated based on a linear combination of reference samples and the prediction sample according to the determined weights.

In an example, the parameter W of the boundary filtering is determined (e.g., derived) based on a block size of the block, a block aspect ratio of the block, whether the block is a luma component or a chroma component, neighboring reconstructed samples of the block, boundary prediction samples in the prediction block, a difference between neighboring reconstructed samples of the block and boundary prediction samples in the prediction block, or a color format of the block. In an example, the parameter W is determined as 8, 4, 16, or 2.

The reference samples can include a left reference sample $R_{-1,y'}$ and a top reference sample $R_{x',-1}$, such as shown in FIG. 7. The weights can include a weight $w_L$ associated with the left reference sample $R_{-1,y'}$, a weight $w_T$ associated with the top reference sample $R_{x',-1}$, and a weight $(64-w_L-w_T)$ associated with the prediction sample pred(x',y'). The weight $w_L$ can be determined as $w_L$=W>>((x'<<1)>>0) and the weight $w_T$ can be determined as $w_T$=W>>((y'<<1)>>0).

In an example, the boundary filtering is performed by a position-dependent predictor combination (PDPC) filter. The filtered prediction sample can be generated as Clip (0, (1<<BitDepth)−1, $(w_L \times R_{-1,y'}+w_T \times R_{x',-1}+(64-w_L-w_T)\times$ pred(x',y')+32)>>6). The parameter BitDepth indicates a bit depth.

Then, the process proceeds to (S999) and terminates.

The process (900) can be suitably adapted. Step(s) in the process (900) can be modified and/or omitted. Additional step(s) can be added. Any suitable order of implementation can be used.

Aspects, aspects, and/or examples in the disclosure may be used separately or combined in any order. Each of the methods (or aspects), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 10 shows a computer system (1000) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
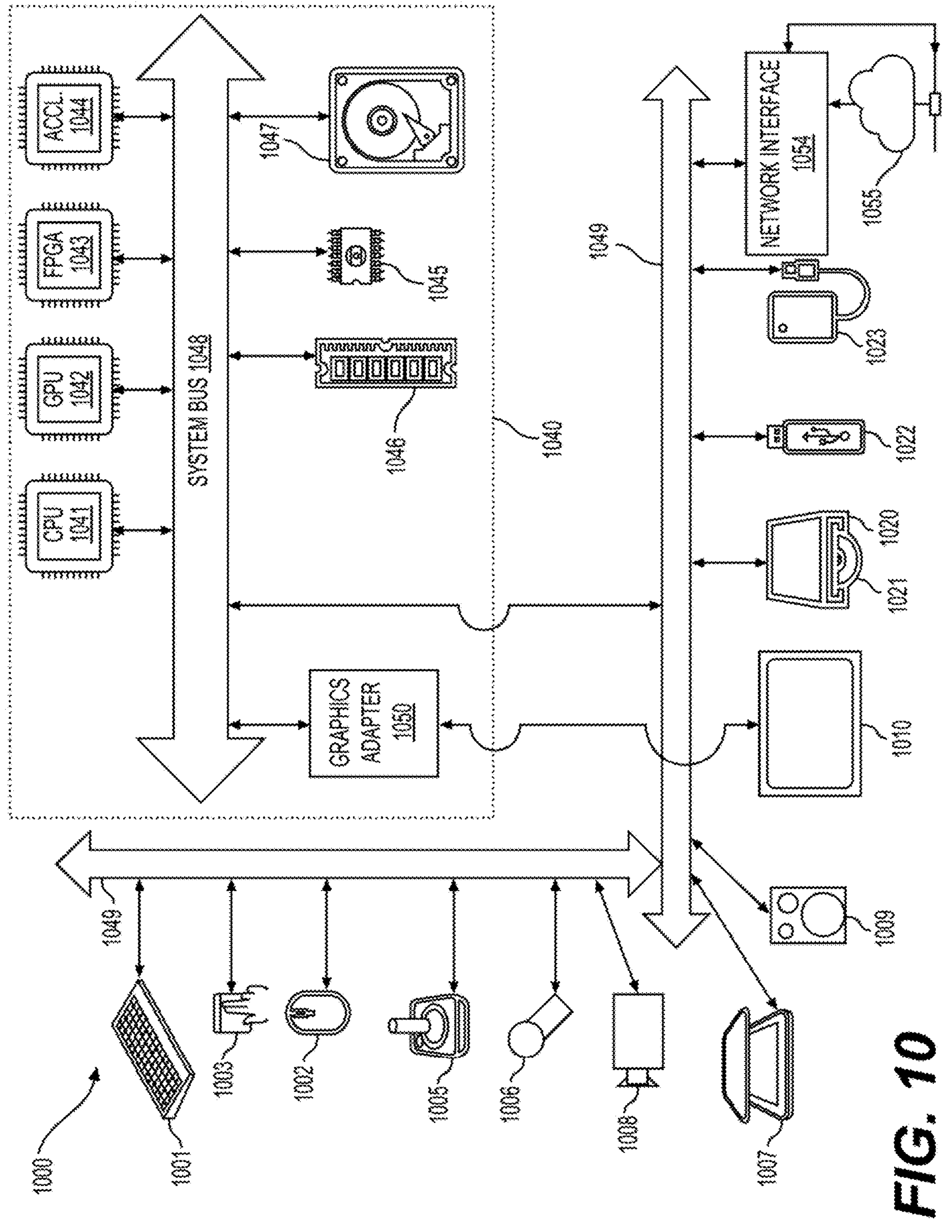
FIG. 10 is a schematic illustration of a computer system in accordance with an aspect.

The components shown in FIG. 10 for computer system (1000) are exemplary in nature and are not intended to suggest any limitation as to the scope of use or functionality of the computer software implementing aspects of the present disclosure. Neither should the configuration of components be interpreted as having any dependency or requirement relating to any one or combination of components illustrated in the exemplary aspect of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can be also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various aspects of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:

receiving a coded video bitstream that includes a current picture with a block coded with one of an intra block copy (IBC) mode and an intra template matching (IntraTMP) mode;

determining a prediction block of the block using the one of the IBC mode and the IntraTMP mode; and when boundary filtering is applied to the prediction block of the block determined using the one of the IBC mode and the IntraTMP mode, applying the boundary filtering to a prediction sample pred(x',y') located at a position (x',y') in the prediction block corresponding to a sample in the block by:

determining a parameter W of the boundary filtering based on coded information of the block coded with the one of the IBC mode and the IntraTMP mode, the parameter W being selected from a plurality of different values;

determining weights used in the boundary filtering by right shifting the parameter W according to the position (x',y'); and generating a filtered prediction sample based on a linear combination of reference samples and the prediction sample according to the determined weights.

2. The method of claim 1, wherein the weights include a weight $w_L$ associated with a left reference sample $R_{-1,y'}$, a weight $w_T$ associated with a top reference sample $R_{x',-1}$, and a weight $(64-w_L-w_T)$ associated with the prediction sample pred(x',y'); and the weight $w_L$ is equal to W>>((x'<<1)>>0) and the weight $w_T$ is equal to W>>((y'<<1)>>0).

3. The method of claim 2, wherein the boundary filtering is performed by a position-dependent predictor combination (PDPC) filter, and the generating the filtered prediction sample includes generating the filtered prediction sample as $\text{Clip}(0, (1<<\text{BitDepth})-1, (w_L \times R_{-1,y'}+w_T \times R_{x',-1}+(64-w_L-w_T)\times \text{pred}(x',y')+32)>>6)$, the BitDepth indicating a bit depth.

4. The method of claim 1, wherein the coded information of the block includes a coding block size, a coding block aspect ratio, whether the block is a luma component or a chroma component, neighboring reconstructed samples of the block, boundary prediction samples in the prediction block, a difference between neighboring reconstructed samples of the block and boundary prediction samples in the prediction block, or a color format of the block.

5. The method of claim 1, wherein the parameter W is determined as 8, 4, 16, or 2.

6. The method of claim 1, further comprising:

determining whether the boundary filtering is applied to the block from neighboring reconstructed samples.

7. The method of claim 6, wherein the determining whether the boundary filtering is applied comprises:

detecting a content type of the neighboring reconstructed samples;

when the content type of the neighboring reconstructed samples is a screen content, the boundary filtering is not applied to the block; and when the content type of the neighboring reconstructed samples is not the screen content, the boundary filtering is applied to the block.

8. The method of claim 7, wherein the detecting the content type comprises:

checking a number of color values of the neighboring reconstructed samples; and when the number of color values is less than a threshold of color values, detecting the content type as the screen content.

9. The method of claim 8, wherein the neighboring reconstructed samples are of a specific color component, and a color value includes a value of the specific color component.

10. The method of claim 8, wherein the neighboring reconstructed samples are associated with multiple color components, and a color value includes a combination of respective values of the multiple color components.

11. The method of claim 1, wherein the boundary filtering is applied only when a color component of the block is a luma component.

12. The method of claim 1, wherein the boundary filtering is applied for each color component associated with the block.

13. The method of claim 1, wherein the boundary filtering is applied only when a current slice including the block is an intra slice.

14. A method of video encoding, comprising:

determining a prediction block of a block in a current picture using one of an intra block copy (IBC) mode and an intra template matching (IntraTMP) mode; and when boundary filtering is applied to the prediction block of the block determined using the one of the IBC mode and the IntraTMP mode, applying the boundary filtering to a prediction sample pred(x',y') located at a position (x',y') in the prediction block corresponding to a sample in the block by:

determining a parameter W of the boundary filtering based on coding information of the block coded with the one of the IBC mode and the IntraTMP mode, the parameter W being selected from a plurality of different values;

determining weights used in the boundary filtering by right shifting the parameter W according to the position (x',y'); and generating a filtered prediction sample based on a linear combination of reference samples and the prediction sample according to the determined weights.

15. The method of claim 14, wherein the weights include a weight $w_L$ associated with a left reference sample $R_{-1,y'}$, a weight $w_T$ associated with a top reference sample $R_{x',-1}$, and a weight $(64-w_L-w_T)$ associated with the prediction sample pred(x',y'); and the weight $w_L$ is equal to W>>((x'<<1)>>0) and the weight $w_T$ is equal to W>>((y'<<1)>>0).

16. The method of claim 15, wherein the boundary filtering is performed by a position-dependent predictor combination (PDPC) filter, and the generating the filtered prediction sample includes generating the filtered prediction sample as Clip (0, (1<<BitDepth)−1, $(w_L \times R_{-1,y'} + w_T \times R_{x',-1} + (64-w_L-w_T) \times \text{pred}(x',y') + 32) >> 6$), the BitDepth indicating a bit depth.

17. The method of claim 14, wherein the coding information of the block includes a coding block size, a coding block aspect ratio, whether the block is a luma component or a chroma component, neighboring reconstructed samples of the block, boundary prediction samples in the prediction block, a difference between neighboring reconstructed samples of the block and boundary prediction samples in the prediction block, or a color format of the block.

18. The method of claim 14, wherein the parameter W is determined as 8, 4, 16, or 2.

19. The method of claim 14, further comprising:

determining whether the boundary filtering is applied to the block from neighboring reconstructed samples.

20. A non-transitory computer-readable storage medium storing instructions which, when executed by a processor, cause the processor to perform a method of encoding a bitstream, the method comprising:

determining a prediction block of a block in a current picture using one of an intra block copy (IBC) mode and an intra template matching (IntraTMP) mode; and when boundary filtering is applied to the prediction block of the block determined using the one of the IBC mode and the IntraTMP mode, applying the boundary filtering to a prediction sample pred(x',y') located at a position (x',y') in the prediction block corresponding to a sample in the block by:

determining a parameter W of the boundary filtering based on coding information of the block coded with the one of the IBC mode and the IntraTMP mode, the parameter W being selected from a plurality of different values;

determining weights used in the boundary filtering by right shifting the parameter W according to the position (x',y');

generating a filtered prediction sample based on a linear combination of reference samples and the prediction sample according to the determined weights;

encoding the bitstream based on the filtered prediction sample; and transmitting the coded bitstream.

* * * * *